United States Patent [19]

Adamitzki

[11] Patent Number: 4,785,275

[45] Date of Patent: Nov. 15, 1988

[54] STRAIN GAUGE

[75] Inventor: Wolfgang Adamitzki, Sulzbach, Fed. Rep. of Germany

[73] Assignee: VDO Adolf Schindling AG, Frankfurt am Main, Fed. Rep. of Germany

[21] Appl. No.: 769,550

[22] Filed: Aug. 26, 1985

[30] Foreign Application Priority Data

Aug. 24, 1984 [DE] Fed. Rep. of Germany ....... 3431114

[51] Int. Cl.<sup>4</sup> .............................................. G01L 1/22
[52] U.S. Cl. ......................................... 338/5; 338/2; 338/306; 73/862.65
[58] Field of Search ............... 338/2, 3, 4, 5, 306–314; 73/682.65; 427/74, 255.2, 255.5, 255.7, 102; 29/610 SG

[56] References Cited

U.S. PATENT DOCUMENTS

| 2,662,957 | 12/1953 | Eisler | 338/2 |
| 4,104,605 | 8/1978 | Boudreaux et al. | 338/2 |
| 4,188,258 | 2/1980 | Mounteer et al. | 338/2 X |
| 4,487,680 | 12/1984 | Logothetis et al. | 338/314 X |
| 4,522,067 | 6/1985 | Burger et al. | 73/862.65 |

Primary Examiner—E. A. Goldberg
Assistant Examiner—M. M. Lateef
Attorney, Agent, or Firm—Martin A. Farber

[57] ABSTRACT

A strain gauge has two metallic resistance layers, contact layers associated therewith, and a support for holding the strain gauge. A partially conductive insulation layer is disposed between the two resistance layers.

18 Claims, 1 Drawing Sheet

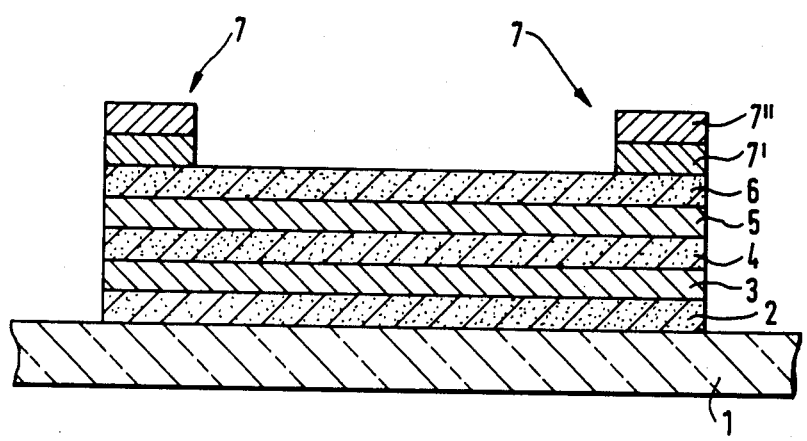

STRAIN GAUGE

BACKGROUND OF THE INVENTION

The invention relates to an electric resistor, particularly a strain gauge, having a metallic resistance layer and contact layers associated therewith, which are arranged on a support.

In such resistors which can be used as strain gauges, it is known to apply a metallic resistance layer onto a support. In that way sensitivities of the strain gauge with a gauge factor of at most about 5 can be obtained.

Strain gauges having a gauge factor of this order of magnitude require, however, a large expense in connection with the measurement means connected with them. In addition, extensive resolution of the measurement is not possible.

It is an object of the invention to create a resistor of the above type which has increased sensitivity.

SUMMARY OF THE INVENTION

According to the invention, a plurality of superimposed metallic resistance layers (3, 5) are applied to the support (1), a partially conductive insulation layer (4) being arranged in each case between them. In this connection the partial conductivity can be obtained, for instance, by a very slight thickness of the insulation layer or by intentionally permitting the existence of impurities in it. This leads to the resistance layers mutually affecting each other electrically, as a result of which a substantial increase in the gauge factor above a value of 5 up to gauge factors of between 10 and 15 can be reached, depending on the number of layers.

In order to avoid disturbances which might come from the support should the latter, for instance, be conductive, an insulation layer (2) can be arranged between the support (1) and that metallic resistance layer (3) which is closest to it.

Negative influences such as corrosion can be prevented on the metallic resistance layer (5) which is furthest from the support (1) by covering it with an insulating layer (6) on the side thereof facing away from the support (1).

Low dependence on temperature up to temperatures of about 150° C. can be obtained if the metallic resistance layer (3, 5) is a chromium layer or a chromium-containing layer.

Silicon layers or silicon-containing layers such as layers of silicon monoxide or silicon dioxide are particularly suitable as insulation layers (2, 4, 6).

In order to obtain good solderability the contact layers (7) are preferably copper layers.

Sputtering and vapor deposition are particularly suitable methods for applying the resistance layers (3, 5) and/or the insulating layers (2, 4, 6) and/or the contact layers (7).

BRIEF DESCRIPTION OF THE DRAWING

With the above and other objects and advantages in view, the present invention will become more clearly understood in connection with the detailed description of a preferred embodiment, when considered with the accompanying drawing of which the only FIGURE is a cross-sectional view of a resistor according to the invention.

DETAILED DESCRIPTION OF THE PREFERRED EMBODIMENT

The resistor shown has a support 1 which may consist, for instance, of glass. Onto this support 1, there are applied by sputtering in sandwich-like manner a first insulation layer 2, a first resistance layer 3, a second insulation layer 4, a second resistance layer 5 and a third insulation layer 6.

Furthermore, contact layers 7 are applied to both ends of the third insulation layer 6, these contact layers serving as solder points for connecting the resistor to a measuring circuit.

The number of alternate insulation layers and resistance layers can be further increased in order to increase the gauge factor.

The resistance layers consist of chromium while the insulation layers may consist of silicon monoxide or silicon dioxide.

The contact layers 7 consist of a layer of chromium 7' applied to the insulation layer 6, the chromium layer in its turn bearing a layer of copper 7''.

I claim:

1. A strain gauge comprising
a support;
contact layers for making electrical contact between the strain gauge and an external circuit;
a plurality of superimposed metallic resistance layers, said resistance layers being disposed on the support and being located between the support and said contact layers;
a partially conductive insulation layer disposed between and in contact with said resistance layers; and wherein
an uppermost one of said resistance layers is connected between one of said contact layers disposed at one end of the gauge and a second of said contact layers disposed at a second end of the gauge, a bottom one of said resistance layers located between said support and said uppermost resistance layer being electrically connected to said uppermost resistance layer by said partially conductive insulation layer to improve a gauge factor of the strain gauge.

2. A strain gauge according to claim 1, further comprising
a second insulation layer located between said support and said bottom metallic resistance layer.

3. A strain gauge according to claim 2, further comprising
a third insulating layer located on a side, facing away from the support, of the uppermost metallic resistance layer.

4. A strain gauge according to claim 1, wherein said metallic resistance layers are chromium layers.

5. A strain gauge according to claim 1, wherein said metallic resistance layers are chromium-containing layers.

6. A strain gauge according to claim 2, wherein said insulation layers are silicon layers.

7. A strain gauge according to claim 2, wherein said insulation layers comprise silicon-containing layers.

8. A strain gauge according to claim 7, wherein said silicon-containing layers comprise layers of silicon monoxide.

9. A strain gauge according to claim 7, wherein said silicon-containing layers comprise layers of silicon dioxide.

10. A strain gauge according to claim 1, wherein said contact layers are copper layers.

11. A strain gauge according to claim 1, wherein said resistance layers are applied by sputtering.

12. A strain gauge according to claim 1, wherein said insulating layers are applied by sputtering.

13. A strain gauge according to claim 1, wherein the contact layers are applied by sputtering.

14. A strain gauge according to claim 1, wherein said resistance layers are applied by vapor deposition.

15. A strain gauge according to claim 1, wherein said insulating layers are applied by vapor deposition.

16. A strain gauge according to claim 1, wherein the contact layers are applied by vapor deposition.

17. A strain gauge according to claim 2, wherein said first-mentioned insulation layer is thinner than said second insulation layer to attain partial conductivity in said first insulation layer.

18. A strain gauge according to claim 2, wherein said first-mentioned insulation layer has a greater concentration of impurities than said second insulation layer to attain partial conductivity in said first insulation layer.

* * * * *